United States Patent [19]
Byrne

[11] 4,217,812
[45] Aug. 19, 1980

[54] INTEGRAL POWER STEERING GEAR WITH VALVE REACTION DEVICE

[75] Inventor: James P. Byrne, Bay City, Mich.

[73] Assignee: General Motors Corporation, Detroit, Mich.

[21] Appl. No.: 945,650

[22] Filed: Sep. 25, 1978

[51] Int. Cl.² ............................................. F15B 9/10
[52] U.S. Cl. ............................... 91/375 A; 74/388 PS; 74/424.8 VA
[58] Field of Search .................... 91/375 A, 375 R; 180/146, 147, 148; 74/499, 388 PS, 424.8 VA, 424.8 VZ

[56] References Cited

U.S. PATENT DOCUMENTS

| | | |
|---|---|---|
| 3,433,127 | 3/1969 | Thompson ..................... 91/375 A |
| 3,868,888 | 3/1975 | Rehfeld ......................... 91/375 R |
| 4,009,641 | 3/1977 | Rohde et al. ................. 91/375 A |

*Primary Examiner*—Paul E. Maslousky
*Attorney, Agent, or Firm*—Charles R. White

[57] ABSTRACT

Power steering gear with integral rotary valve for directing hydraulic pressure fluid to and from a piston nut and in which an internal spring device provides a drag load on the valve body so that the valve spool will be immediately relatively turned on rotation of the stub shaft before there is lash take-up between the threads of the piston nut and screw which drivingly connect the valve body to the piston nut and gear output.

3 Claims, 4 Drawing Figures

INTEGRAL POWER STEERING GEAR WITH VALVE REACTION DEVICE

This invention relates to power steering gears and more particularly to a new and improved power steering gear having an integral rotary hydraulic valve and internal spring means providing auxiliary reaction for the valve so that the valve effectively and efficiently controls operation of the piston nut of the power gear.

Many hydraulic power steering gear systems for vehicles employ a hydraulically actuated piston nut for turning a sector gear or output operatively connected to the dirigible wheels of the vehicle through a steering linkage. Generally, these systems utilize hydraulic valving integral with the gear in which the turning resistance of the tires on the roadway dictates the degree of valve actuation required to build hydraulic pressures on the piston nut that provides the power assist forces required to perform the desired steering maneuver. These systems also employ an input driven screw which is threaded through the piston nut providing a mechanical drive connection from the input to the sector gear. The thread between the screw and piston nut forms part of the reaction system required for valve actuation. When physical lash is present between the threaded connection between the piston nut and screw there is often a slight lag in response in the valving on handwheel movement because the screw threads in or out of the rack piston nut a minute distance until the threads of the screw bottom on the flanks of the threads of the piston nut. When this occurs, the input side of the integral valve is turned or otherwise displaced by further handwheel rotation as the output side is held stationary by the screw grounded through the sector gear to the road wheels. Hydraulic pressure builds in the system as gap closure in the valving produces resistance to pump flow. The selective connection of the piston nut pressure chambers with this pressure and to the exhaust port by the valving produces power assist steering as will be understood by those skilled in this art. While the prior art power steering gears have generally provided efficient and high quality power steering with good reliability, it is the broad objective of this invention to make such gears even more efficient and more effective.

The present invention is thus drawn to a power steering gear having physical lash present in the thread connection between the piston nut and screw. However, such lash does not delay or detract from the valve operation since there is a new and improved spring device in this invention that provides auxiliary reaction for the hydraulic valving so that the valve does not recognize thread clearance when the gear is in a neutral or straight ahead drive condition. This is accomplished in this invention by adding friction between the screw and the piston nut other than at the thread connection between the piston nut and screw.

More particularly in this power steering gear, there is a spring device contained within the piston nut of the gear to provide improved valve operation; this spring device incorporates a plurality of spring fingers that yieldably engage a lobe secured to the screw of the power steering gear to provide reaction for the output side of the rotary valve that allows the input side to be immediately rotated relative thereto by the vehicle operator. On rotation of the input, the valve is immediately actuated to accelerate the hydraulic operation of the piston nut and the mating output sector gear. In the preferred embodiment of this invention, the spring fingers provide the auxiliary reaction only when the gear is conditioned for a straight ahead mode of operation so that there is no additional friction forces to be overcome when the handwheel is released and the gear returns toward the centered position.

Accordingly, it is a feature, object and advantage of this invention to provide a new and improved integral power steering gear having a threaded connection between an input driven screw of the gear and the hydraulically actuated piston nut and further having a spring device mounted within the piston nut that produces auxiliary or artificial reaction for the relatively rotatable valve elements so that the valve immediately responds to input turning regardless of lash in the threaded connection for the improved hydraulic actuation of the piston nut and the turning of the gear output.

It is another feature, object and advantage of this invention to provide a new and improved power steering gear having an integral valve arrangement with relatively rotatable valve parts in which one of the valve parts is held with respect to the first valve part by auxiliary spring means internal of the steering gear as the gear is moved from the straight ahead position so that there is instantaneous relative movement of the valve parts for the accelerated hydraulic actuation of the piston nut in response to manual turning of the input shaft of the gear.

It is another feature, object and advantage of this invention to provide a new and improved integral power steering gear in which a spring device provides reaction for a hydraulic valve output on rotation of an input shaft which drives a valve input so that the valve will be immediately actuated regardless of lash occurring in the threaded connection between the threads of the screw and the piston nut for improving the efficiency of valve and power steering operation.

These and other features, objects and advantages of this invention will be more apparent from the following detailed description and drawings in which.

Figure 1:
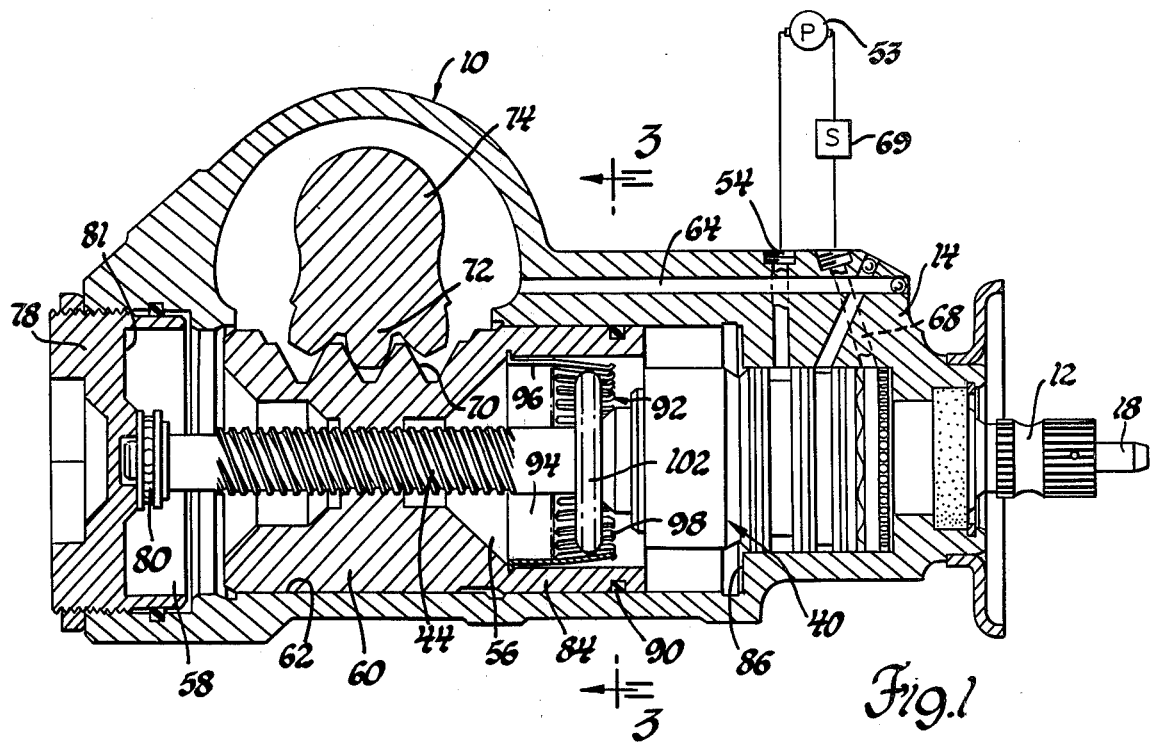
FIG. 1 is a side view partially in section of an integral power steering gear in accordance with this invention.
Figure 2:
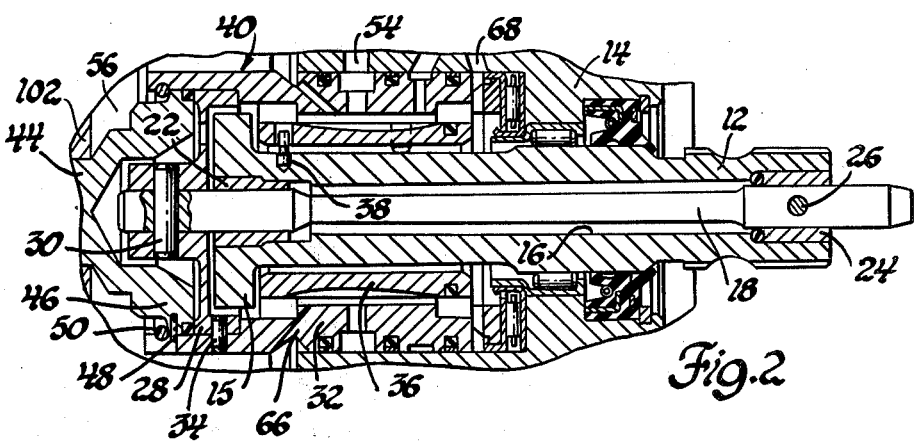
FIG. 2 is a view of a portion of the power steering gear of FIG. 1 which shows the rotary valve thereof in section.
Figure 3:
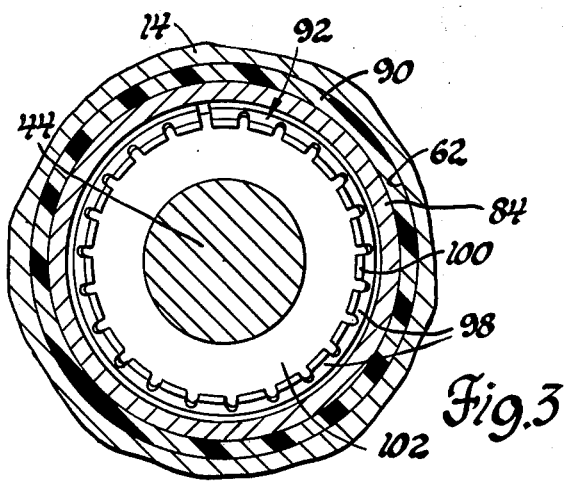
FIG. 3 is a view taken along lines 3—3 of FIG. 1.

Turning now in greater detail to the drawings, there is shown in FIGS. 1 and 2 a power steering gear 10 having an elongated stub shaft 12 mounted for turning movement in a steering gear housing 14 and terminating in an enlarged head portion 15. The stub shaft has an axial passage 16 therethrough which receives a torsion bar 18 supported for twisting movement therein by bearings 22 and 24. The outer end of the torsion bar is secured by pin 26 to the stub shaft 12 while the inner end is drivingly connected to an annular end cap 28 by a connector pin 30. The end cap 28 is in turn operatively connected to a cylindrical valve body 32 by radial pin 34. The valve body 32 extends axially in the housing and is supported for limited turning movement therein with respect to an open center valve spool 36 inwardly concentric with respect to the valve body 32. The valve spool 36 is drivingly connected to the stub shaft 12 by radial pin 38 for turning movement therewith.

The valve body and valve spool being yieldably interconnected by the torsion bar are relatively rotatable with respect to each other when the valve body is grounded and when there is turning movement of the stub shaft from the handwheel, not shown. The valve body and spool form a valve assembly 40 controlling the hydraulic operation of the steering gear as more fully explained in U.S. Pat. No. 3,022,772 issued Feb. 27, 1962 to B. B. Zeigler et al for Rotary Power Steering Valve with Torsion Bar Centering and in U.S. Pat. No. 4,009,641 to Robert P. Rohde et al for Compact Power Steering Gear. These disclosures are hereby incorporated into this specification by reference. An elongated screw or worm 44 extends axially in the housing 14 from the inboard end of valve assembly 40. As shown, the screw has an enlarged annular head 46 which nests within the inner end of the valve body 32 and which is secured thereto by pin and slot means 48 and by a retainer ring 50. These connections prevent axial separation of the screw and the valve body as well as their relative rotation. The screw 44 is also operatively connected to the head portion 15 of the stub shaft 12 by a suitable lost motion mechanism which is known in the art and is fully described in the patents to Zeigler et al and Rohde et al identified above.

The valve assembly 40 is fed with pressure fluid from a power steering pump 53 through a pressure port 54 and connected inlet passage. The valve assembly controls the supply and exhaust of pressure fluid to and from pressure chambers 56 and 58 formed on either side of a piston nut 60 slidably mounted in a bore 62 formed in housing 14. As shown, passage 64 in the housing 14, hydraulically connects the chamber 58 with the valve assembly 40 and passage 66 in the valve body 32 hydraulically connects chamber 56 with the valve assembly. Return port 68 is an exhaust for conducting fluid from the valve assembly 40 back to the power steering sump 69 and pump 53 as more fully described in the above referenced patents to Zeigler et al and Rohde et al.

The piston nut 60 has a rack whose teeth 70 mesh with the teeth 72 of a sector gear 74 mounted for limited turning movement in housing 14. The sector gear 74 is operatively connected through a pitman shaft and an associated steering linkage to the dirigible wheels of the vehicle, which are not shown.

The steering gear housing 14 is closed by an adjuster plug 78 threaded into one end thereof. As shown, the screw 44 extends axially into the housing and is supported at one end by a thrust bearing assembly 80 operatively disposed between the adjuster plug and a shoulder on screw 44. The interior radial wall 81 of this plug serves as a stop to limit the stroke of the piston nut in moving to the left. The screw 44 is threaded through the piston nut 60 and as shown in FIG. 1 may have multiple start threads which mesh with corresponding threads in the piston nut. The piston nut 60 has a cylindrical skirt 84 which extends axially in the bore 62 toward the radial end wall 86 formed in housing 14 at one end of bore 62. This end wall serves as a limit stop for the piston nut when fully stroked to the right in viewing FIG. 1. Disposed in an annular groove adjacent to the end of the skirt is an annular seal 90 which contacts the inner wall of bore 62 to provide for the separate fluid chambers 56 and 58.

Figure 4:
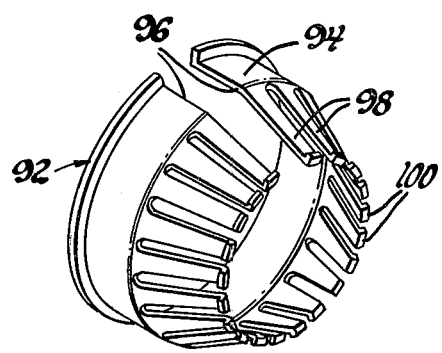
FIG. 4 is a perspective view of the spring device of FIGS. 1-3 to provide reaction for the relatively rotatable valve elements of the power steering gear of this invention.

Mounted within the extension or skirt of the piston nut is a metallic spring 92 which provides auxiliary or artificial reaction for the relatively rotatable valve components of the valve assembly under certain operating conditions. More particularly, this spring device is a one-piece stamping of spring stock having a partially cylindrical body 94 terminating in facing edge portions 96 which are closely adjacent to one another. The body 94 can be constricted so that the spring 92 can be easily installed within the piston skirt 84 and on release from the constricting force will expand into yielding engagement with the interior wall of the skirt so that the spring is maintained in fixed position therein. As best shown in FIGS. 1 and 4, the spring has a ring of fingers 98 which extend axially from body 94 gradually tapering inwardly and terminating in tips 100. These tips yieldably engage the annular peripheral surface of a lobe 102 which is secured to the shank of screw 44. The tips of the spring fingers are such that they yieldably engage the outer surface of the lobe when the piston nut 60 is in a centered position and the rotary valve assembly 40 is in a neutral or straight ahead steering position in which oil flows from the pump into the pressure port 54 through the open center valve spool 36 and back to the pump reservoir through the return port 68. With the valve body yieldably held by the spring fingers 98 in the centered valve position, rotating of the stub shaft 12 for power assist steering will effect rotation of the valve spool 36 relative to the valve body regardless of the lash in the threaded connection between the screw 44 and the piston nut 60. With this relative rotation, the valve assembly is immediately conditioned for right or left turn power steering according to direction of stub shaft rotation in which pressure fluid from the pump 53 is directed to one of the pressure chambers 56 or 58 as the other chamber is opened to exhaust. The lash between the screw 44 and the piston nut is rapidly taken up so that the valve body is quickly grounded through the threaded mechanical connection. As the piston nut strokes the spring fingers are moved from engagement with the periphery of the lobe 102. Thus, auxiliary spring resistance is immediately removed from the valve body as the piston nut strokes for power right and left turn operation to actuate the sector gear 74 and the associated steering gear linkage. This is beneficial in that there is no added spring resistance when the handwheel is released and the sector gear and piston nut are returned toward the on center steering area. In other words, this construction beneficially provides for low friction when the gear is in the off center area to enhance good returnability of the gear components toward their centered position.

From the above, it will be appreciated that the spring load exerted on the valve body is in parallel to the ground through the threaded connection so the valve spool and body will not rotate as a unit as lash is being taken up in the threaded connection. Accordingly, this invention provides for improved steering gear valve actuation since there is a yielding spring resistance added to the valve components permitting their relative rotation which functions at least until the lash between the screw and the piston nut is taken up. Accordingly, the actuation of the valve will be quicker as compared to prior constructions and with resulting improved and more efficient power gear operation.

While a preferred embodiment of this invention has been shown and described to illustrate the invention, other embodiments will become more apparent to those skilled in the art. Accordingly, the scope of this invention is set forth in the following claims.

I claim:

1. A power steering gear comprising a housing, an input mounted for turning movement in said housing, an output leading from said housing, piston means drivingly connected to said output mounted for longitudinal sliding movement in said housing and cooperating therewith to provide a pair of expansible and contractible fluid pressure chambers, rotatable threaded means extending axially through said piston means and being threadedly connected thereto, said threaded connection having lash accommodating small angular movement of said threaded means without corresponding movement of said piston means, a source of fluid pressure, valve means in said housing for controlling the flow of pressure fluid between said chambers and said source, said valve means comprising first and second valve members, said first valve member being connected to said input and said second valve member being connected to said threaded means, said first valve member being relatively rotatable with respect to said second valve member when said second valve member is held stationary relative to said first valve member to control the supply and exhaust of fluid to and from said chambers, and spring means operatively connected between said piston means and said threaded means to provide a yielding reaction force to hold said second valve member stationary with respect to said first valve member in response to the initial turning of said input so that said valve means is actuated as lash is being taken up in said threaded connection to hydraulically connect one of said chambers with said fluid pressure source for the hydraulic assist movement of said piston means and said output.

2. A power steering gear comprising a housing, a shaft providing an input mounted for turning movement in said housing, a sector gear providing an output, piston nut means operatively connected to said sector gear mounted for longitudinal sliding movement in said housing and cooperating therewith to provide a pair of expansible and contractible fluid pressure chambers, rotatable threaded means extending axially through said piston nut means and being threadably connected thereto, said threaded connection having lash accommodating small angular movement of said threaded means without corresponding movement of said piston nut means, a source of fluid pressure, valve means in said housing for controlling the flow of pressure fluid between said chambers and said source, said valve means comprising first and second valve members, said first valve member being connected to said shaft and said second valve member being connected to said threaded means, said first valve member being relatively rotatable with respect to said second valve member when said second valve member is held stationary with respect to said first valve member and said shaft is turned to control the supply and exhaust of fluid to and from said chambers, and spring means secured to said piston nut means for frictionally engaging said threaded means to provide a yielding reaction force to hold said second valve member stationary with respect to said first valve member in response to the turning of said shaft so that said valve means hydraulically connects at least one of said chambers with said fluid pressure source for the hydraulic assist movement of said piston nut means and said sector gear.

3. A power steering gear conditionable for the left, right and on center steering of a vehicle comprising a housing, a stub shaft mounted for turning movement in said housing, a sector gear providing an output, piston nut means operatively connected to said sector gear mounted for longitudinal sliding movement in said housing and cooperating therewith to provide a pair of expansible and contractible fluid pressure chambers, rotatable screw means extending axially through said piston nut means and being threadedly connected thereto, said threaded connection having lash accommodating small angular movement of said screw means without corresponding movement of said piston nut means, a source of fluid pressure, valve means in said housing for controlling the flow of pressure fluid between said chambers and said source, said valve means comprising first and second valve members, said first valve member being connected to said input and said second valve member being connected to said screw means, said first valve member being relatively rotatable with respect to said second valve member to control the supply and exhaust of fluid to and from said chambers, and spring means secured to said piston nut means for frictionally engaging said threaded means only when said steering gear is conditioned for on center operation to provide a yielding reaction force to hold one of said valve members stationary with respect to the other in response to the turning of said stub shaft so that said valve means connects at least one of said chambers with said fluid pressure source for the hydraulic assist movement of said piston nut means and said sector gear.

* * * * *